United States Patent
Zhang et al.

(10) Patent No.: US 12,451,942 B2
(45) Date of Patent: Oct. 21, 2025

(54) CHANNEL STATE INFORMATION REPORT FOR MULTI-TRP OPERATION

(71) Applicant: Apple Inc., Cupertino, CA (US)

(72) Inventors: Yushu Zhang, Beijing (CN); Dawei Zhang, Saratoga, CA (US); Haitong Sun, Cupertino, CA (US); Wei Zeng, Saratoga, CA (US); Weidong Yang, San Diego, CA (US)

(73) Assignee: Apple Inc., Cupertino, CA (US)

( * ) Notice: Subject to any disclaimer, the term of this patent is extended or adjusted under 35 U.S.C. 154(b) by 735 days.

(21) Appl. No.: 17/593,449

(22) PCT Filed: May 14, 2020

(86) PCT No.: PCT/CN2020/090360
§ 371 (c)(1),
(2) Date: Sep. 19, 2021

(87) PCT Pub. No.: WO2021/226964
PCT Pub. Date: Nov. 18, 2021

(65) Prior Publication Data
US 2022/0302976 A1    Sep. 22, 2022

(51) Int. Cl.
*H04B 7/06*    (2006.01)
*H04B 17/345*    (2015.01)

(52) U.S. Cl.
CPC ......... *H04B 7/0626* (2013.01); *H04B 7/0632* (2013.01); *H04B 17/345* (2015.01); *H04B 7/0639* (2013.01)

(58) Field of Classification Search
CPC .. H04B 17/345; H04B 7/0626; H04B 7/0632; H04B 7/0639; H04L 1/0026; H04L 5/005
See application file for complete search history.

(56) References Cited

U.S. PATENT DOCUMENTS

2019/0074886 A1*    3/2019    Yoon ................ H04B 17/318
2020/0045744 A1*    2/2020    Sun ................ H04W 74/0808
(Continued)

FOREIGN PATENT DOCUMENTS

| WO | 2018/229078 | 12/2018 |
|---|---|---|
| WO | 2019/101034 | 5/2019 |

(Continued)

OTHER PUBLICATIONS

Huawei et al., "CSI measurement enhancement for multi-TRP/panel transmission"; 3GPP TSG RAN WG1 Meeting #96bis; R1-1903982; Apr. 12, 2019; 6 sheets.
(Continued)

*Primary Examiner* — Zhensheng Zhang
(74) *Attorney, Agent, or Firm* — Fay Kaplun & Marcin, LLP

(57) ABSTRACT

Various manners of reporting channel state information (CSI) measurements in a multiple transmission and reception point (multi-TRP) configuration are provided. A UE may perform channel state information (CSI) measurements for a channel measurement resource (CMR) for the first gNB and at least one interference measurement resource (IMR) for the at least one second gNB, determine a configuration for a CSI report for the CSI measurements including a channel quality indicator (CQI) measurement for the CMR and the at least one IMR and transmit the CSI report to at least one of the first gNB and the at least one second gNB.

20 Claims, 6 Drawing Sheets

(56) References Cited

U.S. PATENT DOCUMENTS

| | | | | |
|---|---|---|---|---|
| 2020/0395988 A1* | 12/2020 | Lee | ........................ | H04L 5/0087 |
| 2021/0297135 A1* | 9/2021 | Kim | ........................ | H04L 5/0062 |
| 2023/0093589 A1* | 3/2023 | Wu | ........................ | H04B 7/022 |
| | | | | 375/267 |

FOREIGN PATENT DOCUMENTS

| | | |
|---|---|---|
| WO | 2020/032621 | 2/2020 |
| WO | 2020/060338 | 3/2020 |
| WO | 2020/060347 | 3/2020 |
| WO | WO-2021033220 A1 * | 2/2021 |

OTHER PUBLICATIONS

ZTE, "Enhancements on multi-beam operation"; 3GPP TSG RAN WG1 Meeting #96bis; R1-1904014; Apr. 12, 2019; 17 sheets.
ZTE, "Enhancements on multi-beam operation"; 3GPP TSG RAN WG1 Meeting #96bis; R1-1910285; Oct. 20, 2019; 24 sheets.
Ericsson, "Remaining issues on multi-beam enhancements"; 3GPP TSG-RAN WG1 Meeting #98bis; R1-1911224; Oct. 20, 2019; 15, sheets.
Apple Inc., "Remaining Issues on Multi-beam operation"; 3GPP TSG-RAN WG1 Meeting #98bis; R1-1910969; Oct. 20, 2019; 14 sheets.
Spreadtrum Communications, "Discussion on Multi-TRP transmission", 3GPP TSG RAN WG1 #98bis, R1-1910023, Oct. 20, 2019, 14 sheets.

\* cited by examiner

600

Rank restriction = {0101}

|  | RI2 = 0 | RI2 = 1 | RI2 = 2 |
|---|---|---|---|
| RI1 = 0 | Allowed | Not allowed | Allowed |
| RI1 = 1 | Not allowed | Allowed | Not allowed |
| RI1 = 2 | Allowed | Not allowed | Not allowed |

CHANNEL STATE INFORMATION REPORT FOR MULTI-TRP OPERATION

BACKGROUND INFORMATION

Multiple transmission and reception point (multi-TRP) functionality in 5G New Radio (NR) involves a UE maintaining multiple links with multiple TRPs (e.g. multiple gNBs) simultaneously on the same carrier. Channel state information (CSI) may be measured for each beam pair, however, individual CSI measurements on each beam pair cannot reflect a real channel quality when both links are used for DL transmissions.

SUMMARY

Some exemplary embodiments are related to a method performed by a user equipment (UE) in a multiple transmission and reception point (multi-TRP) configuration having simultaneous connections with a first next generation node B (gNB) and at least one second gNB over a same carrier. The method includes performing channel state information (CSI) measurements for a channel measurement resource (CMR) for the first gNB and at least one interference measurement resource (IMR) for the at least one second gNB, determining a configuration for a CSI report for the CSI measurements including a channel quality indicator (CQI) measurement for the CMR and the at least one IMR and transmitting the CSI report to at least one of the first gNB and the at least one second gNB.

Other exemplary embodiments are related to a user equipment (UE) having a transceiver and a processor. The transceiver is configured to simultaneously connect with a first next generation node B (gNB) and at least one second gNB over a same carrier. The processor is configured to perform channel state information (CSI) measurements for a channel measurement resource (CMR) for the first gNB and at least one interference measurement resource (IMR) for the at least one second gNB, and determine a configuration for a CSI report for the CSI measurements including a channel quality indicator (CQI) measurement for the CMR and the at least one IMR. The transceiver is further configured to transmit the CSI report to at least one of the first gNB and the at least one second gNB.

Still further exemplary embodiments are related to a method performed by a user equipment (UE) in a multiple transmission and reception point (multi-TRP) configuration having simultaneous connections with a first next generation node B (gNB) and at least one second gNB over a same carrier. The method includes performing channel state information (CSI) measurements for a first channel measurement resource (CMR) for the first gNB and a second CMR for the at least one second gNB, determining a configuration for a CSI report for the CSI measurements including a channel quality indicator (CQI) measurement for each of the first and the second CMR and transmitting the CSI report to at least one of the first gNB and the at least one second gNB.

Additional exemplary embodiments are related to a user equipment (UE) having a transceiver and a processor. The transceiver is configured to simultaneously connect with a first next generation node B (gnB) and at least one second gNB over a same carrier. The processor is configured to perform channel state information (CSI) measurements for a first channel measurement resource (CMR) for the first gNB and a second CMR for the at least one second gNB, and determine a configuration for a CSI report for the CSI measurements including a channel quality indicator (CQI) measurement for each of the first and the second CMR. The transceiver is further configured to transmit the CSI report to at least one of the first gNB and the at least one second gNB.

DETAILED DESCRIPTION

Figure 1:
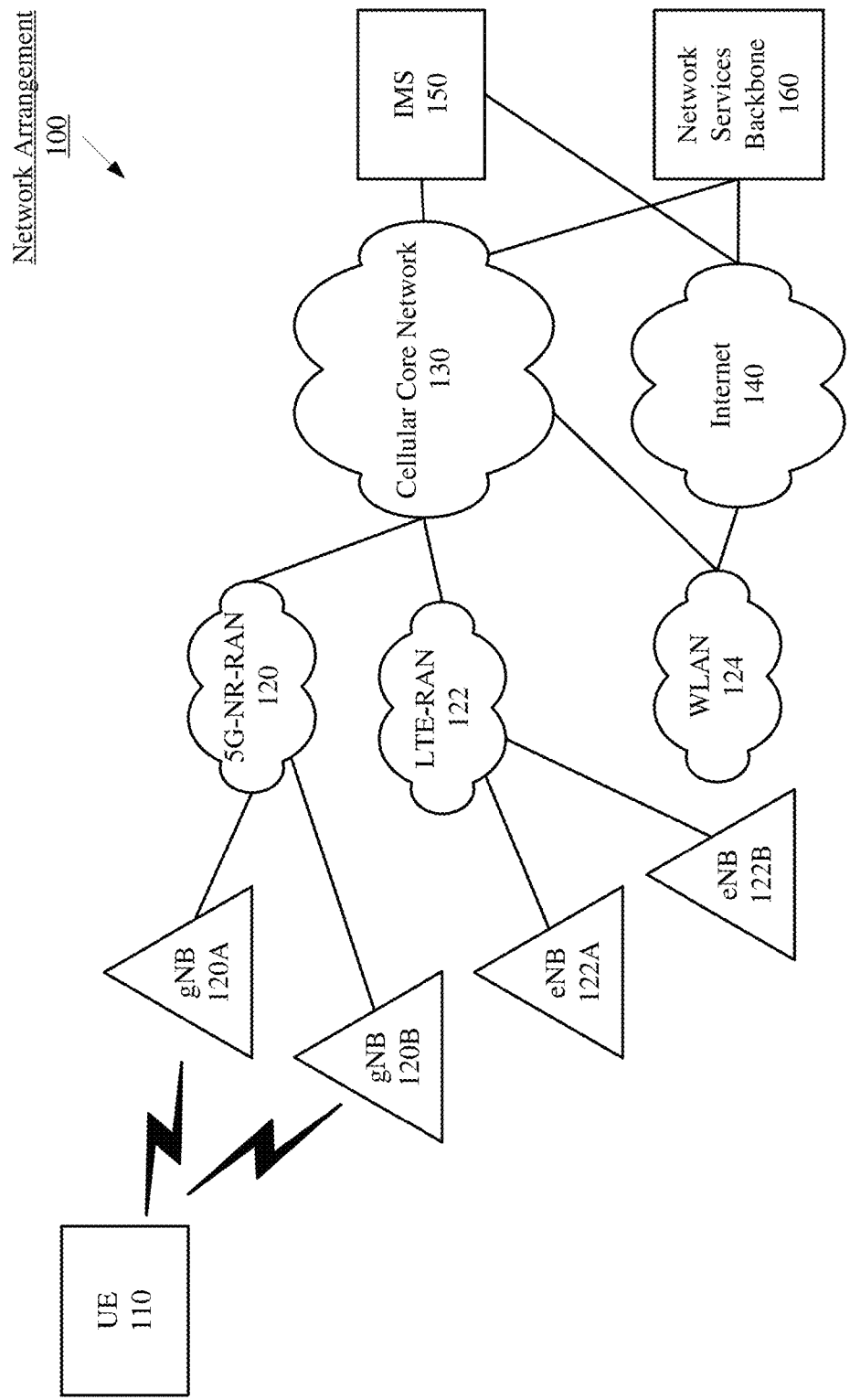
FIG. 1 shows a network arrangement according to various exemplary embodiments.

The exemplary embodiments may be further understood with reference to the following description and the related appended drawings, wherein like elements are provided with the same reference numerals. The exemplary embodiments describe channel measurement resource (CMR) configurations and reporting configurations for various multi-TRP scenarios described below.

Multiple transmission and reception point (multi-TRP) functionality involves a UE maintaining multiple links with multiple TRPs (e.g. multiple gNBs) simultaneously on the same carrier. However, in multi-TRP operation where the UE may only report the CSI for each beam pair link independently, e.g., a first CSI (CSI1) for a first beam pair link from a first TRP (TRP1) and a second CSI (CSI2) for a second beam pair link from a second TRP (TRP2), an individual CSI corresponding to only one beam pair link cannot reflect the real channel quality when multiple links are used for the PDSCH transmission.

A first exemplary embodiment describes channel measurement resource (CMR) and interference measurement resource (IMR) configurations for determining CSI and reporting configurations for the CSI report that includes parameters for neighbor cell interference. A second exemplary embodiment describes CMRs for determining CSI for both beam pairs and transmitting both sets of measurements to each of the multi-TRP gNBs.

Network/Devices

FIG. 1 shows an exemplary network arrangement 100 according to various exemplary embodiments. The exemplary network arrangement 100 includes a user equipment (UE) 110. Those skilled in the art will understand that the UE may be any type of electronic component that is configured to communicate via a network, e.g., a component of a connected car, a mobile phone, a tablet computer, a smartphone, a phablet, an embedded device, a wearable, an Internet of Things (IoT) device, etc. It should also be understood that an actual network arrangement may include any number of UEs being used by any number of users. Thus, the example of a single UE 110 is merely provided for illustrative purposes.

The UE 110 may communicate directly with one or more networks. In the example of the network configuration 100, the networks with which the UE 110 may wirelessly communicate are a 5G NR radio access network (5G NR-RAN) 120, an LTE radio access network (LTE-RAN) 122 and a wireless local access network (WLAN) 124. Therefore, the UE 110 may include a 5G NR chipset to communicate with the 5G NR-RAN 120, an LTE chipset to communicate with the LTE-RAN 122 and an ISM chipset to communicate with the WLAN 124. However, the UE 110 may also communicate with other types of networks (e.g. legacy cellular networks) and the UE 110 may also communicate with networks over a wired connection. With regard to the exemplary embodiments, the UE 110 may establish a connection with the 5G NR-RAN 122.

The 5G NR-RAN 120 and the LTE-RAN 122 may be portions of cellular networks that may be deployed by cellular providers (e.g., Verizon, AT&T, Sprint, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UE 110 may connect to the 5G NR-RAN via at least one of the next generation nodeB (gNB) 120A and/or the gNB 120B. The gNBs 120A, 120B may be configured with the necessary hardware (e.g., antenna array), software and/or firmware to perform massive multiple in multiple out (MIMO) functionality. Massive MIMO may refer to a base station that is configured to generate a plurality of beams for a plurality of UEs. Reference to two gNB 120A, 120B is merely for illustrative purposes. The exemplary embodiments may apply to any appropriate number of gNBs. Specifically, the UE 110 may simultaneously connect to and exchange data with a plurality of gNBs 120A, 120B in a multi-cell CA configuration or a multi-TRP configuration. The UE 110 may also connect to the LTE-RAN 122 via either or both of the eNBs 122A, 122B, or to any other type of RAN, as mentioned above. In the network arrangement 100, the UE 110 is shown as having a simultaneous connection to the gNBs 120A and 120B. The connections to the gNBs 120A, 120B may be, for example, multi-TRP connections where both of the gNBs 120A, 120B provide services for the UE 110 on a same channel.

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
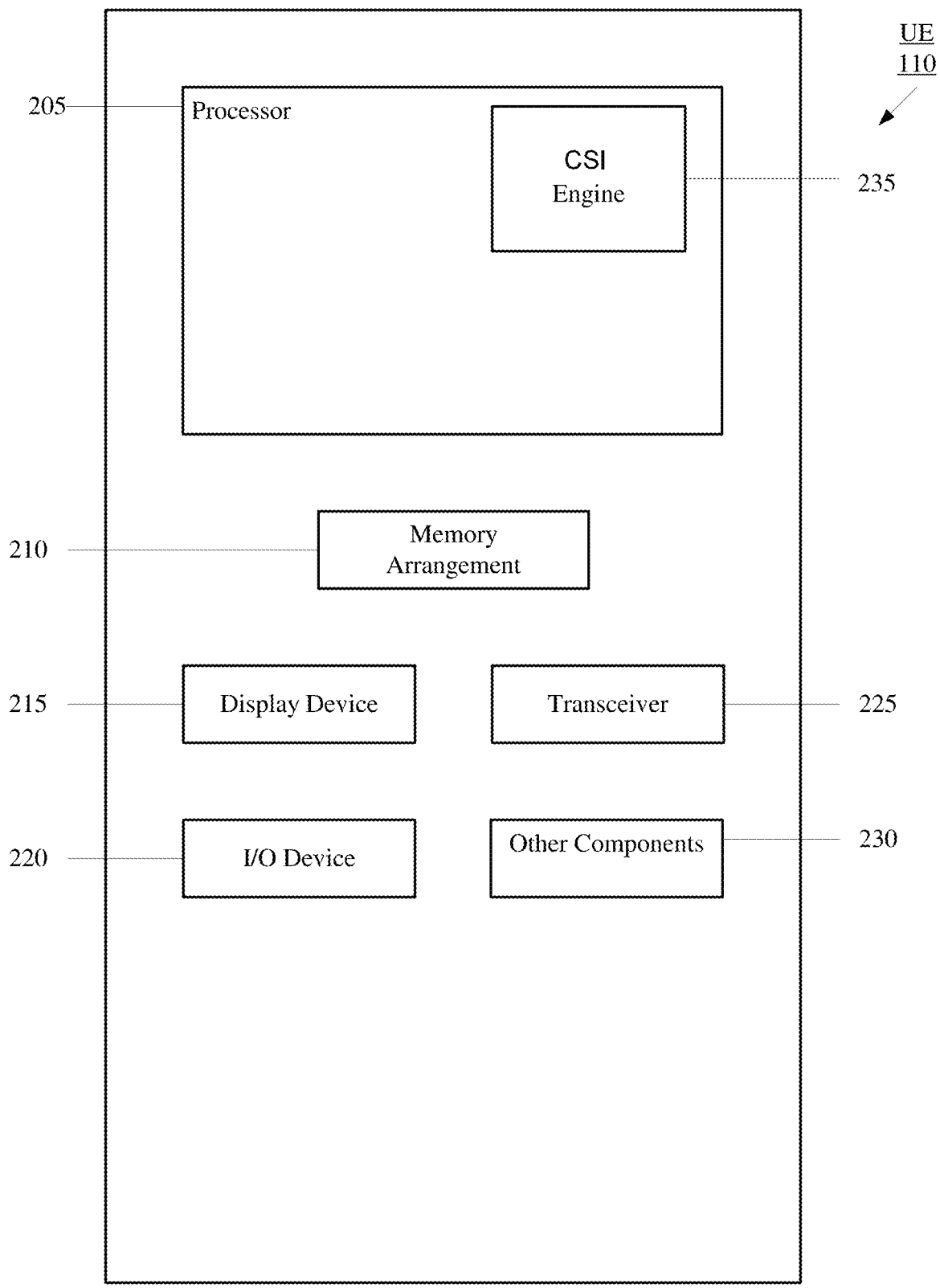
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc.

The processor 205 may be configured to execute a plurality of engines for the UE 110. For example, the engines may include a channel state information (CSI) engine 235. The CSI engine 235 may perform operations including performing CSI measurements and generating a CSI report. The specific implementations for various scenarios will be described in further detail below.

The above referenced engine being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE. The memory 210 may be a hardware component configured to store data related to operations performed by the UE 110.

The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G-NR RAN 120, the LTE RAN 122 etc. Accordingly, the transceiver 225 may operate on a variety of different frequencies or channels (e.g., set of consecutive frequencies).

Figure 3:
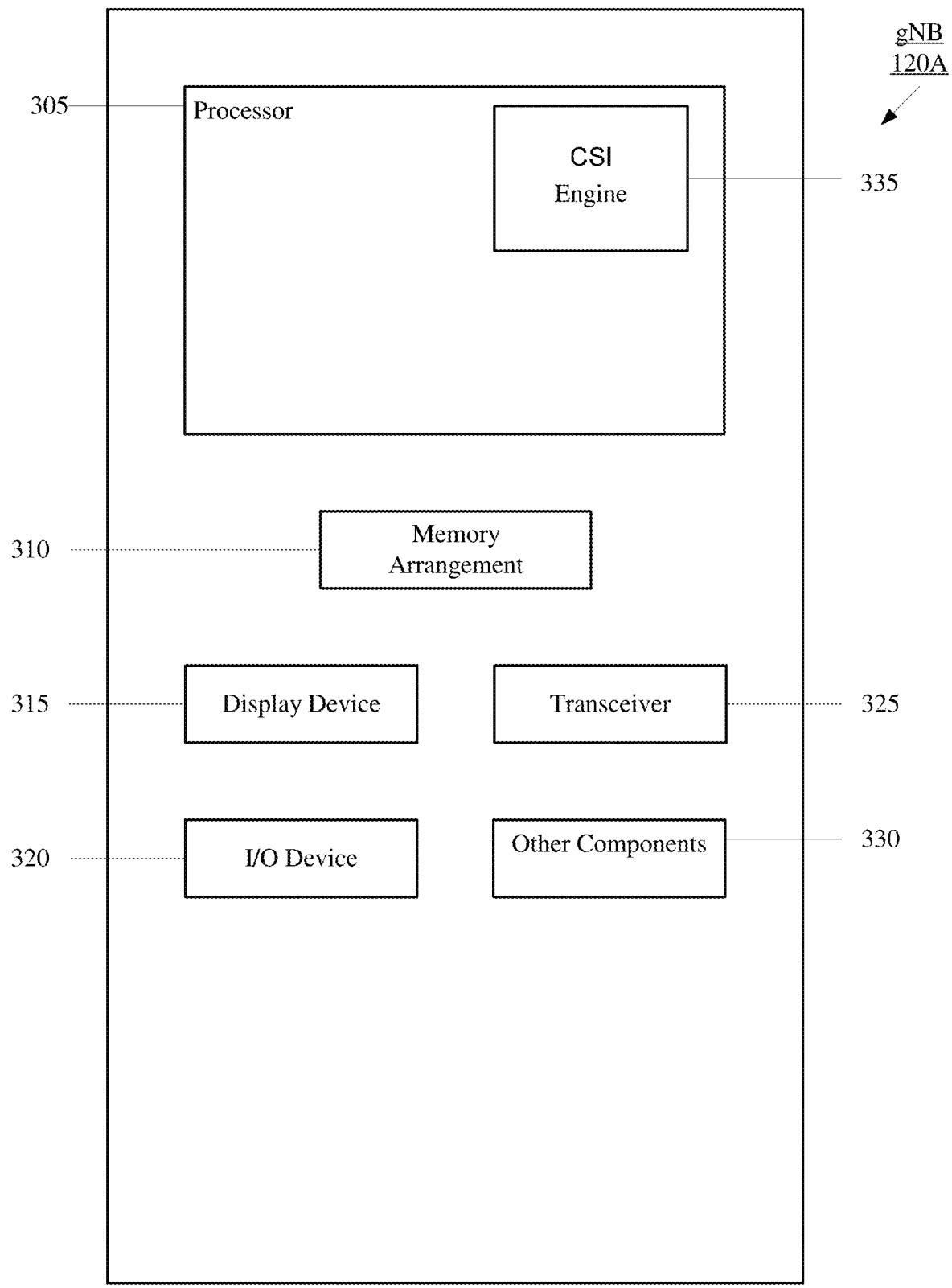
FIG. 3 shows an exemplary network cell according to various exemplary embodiments.

FIG. 3 shows an exemplary network cell, in this case gNB 120A, according to various exemplary embodiments. As noted above with regard to the UE 110, the gNB 120A may represent a cell in a multi-TRP configuration with the UE 110. The gNB 120A may represent any access node of the 5G NR network through which the UEs 110, 112 may establish a connection and manage network operations. The gNB 120A illustrated in FIG. 3 may also represent the gNB 120B.

The gNB 120A may include a processor 305, a memory arrangement 310, an input/output (I/O) device 320, a transceiver 325, and other components 330. The other components 330 may include, for example, an audio input device, an audio output device, a battery, a data acquisition device, ports to electrically connect the gNB 120A to other electronic devices, etc.

The processor 305 may be configured to execute a plurality of engines of the gNB 120A. For example, the engines may include a CSI engine 335. The CAM engine 335 may perform operations including configuring a UE to perform CSI measurements and generate a CSI report for transmission to the gNB. The specific implementations for various scenarios will be described in further detail below.

The above noted engines each being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary embodiments may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UEs 110, 112 and any other UE in the system 100, e.g. if the gNB 120A serves as a PCell or an SCell to either or both of the UEs 110, 112. The transceiver 325 may operate on a variety of different frequencies or channels (e.g., set of consecutive frequencies). Therefore, the transceiver 325 may include one or more components (e.g., radios) to enable the data exchange with the various networks and UEs.

CSI Configurations for 5G NR

In Rel-15, channel state information (CSI) is reported by a UE to a gNB and may include some or all of the following information: a CSI-RS resource index (CRI), a Rank Indicator (RI), a Precoder Matrix Indicator (PMI), a Layer Indicator (LI), and a Channel Quality Indicator (CQI). The CSI may be reported by a physical uplink shared channel (PUSCH), a short physical uplink control channel (PUCCH) or a long PUCCH. When the CSI is reported by a PUSCH or a long PUCCH, it is divided into two parts. The first part (part 1) of the CSI may include a CRI, an RI and/or a CQI for the first codeword (CQI1) and has a fixed payload size. The second part (part 2) of the CSI may include the remainder of the CSI that was not included in CSI part 1, e.g., a PMI, an LI and a CQI for the second codeword (CQI2), and may further include other subband PMI/CQI. The payload size for CSI part 2 is determined by the content of CSI part 1.

Figure 4:
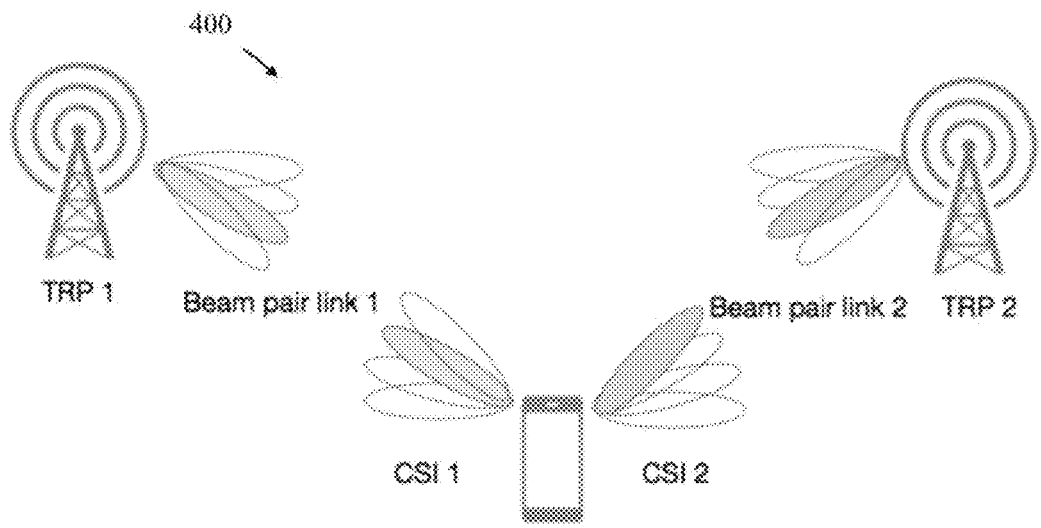
FIG. 4 shows a network arrangement with a UE in multi-TRP operation where the UE may only report the CSI for each beam pair link independently.

In Rel-17, the CSI enhancement is to support multi-TRP operation. In multi-TRP operation, a UE may receive a physical downlink shared channel (PDSCH) from multiple TRPs. To support multi-TRP operation, the UE may report the CSI with regard to non-coherent transmissions from multiple gNBs. FIG. 4 shows a network arrangement 400 with a UE in multi-TRP operation where the UE may only report the CSI for each beam pair link independently, i.e. a first CSI (CSI1) for a first beam pair link from a first TRP (TRP1) and a second CSI (CSI2) for a second beam pair link from a second TRP (TRP2). However, an individual CSI corresponding to only one beam pair link cannot reflect the real channel quality when multiple links are used for the PDSCH transmission.

The exemplary embodiments describe a configuration for the content of the reported CSI and a transmission scheme for the CSI via the UL channels. In a first step, a channel measurement resource (CMR) configuration and an interference measurement resource (IMR) configuration is determined. In a second step, a report quantity for a CSI report is determined. In a third step, multiplexing schemes are determined for the CSI report when the CSI is reported by PUSCH/PUCCH. Each of the steps will be described in further detail below according to various exemplary embodiments.

In a first exemplary embodiment, with regard to the first step above, the UE may be configured to report the CSI measured from a first gNB with regard to the interference from a second neighbor gNB. The CQI reported by the UE considers the neighbor gNB as an interference gNB. For example, if it were considered that the gNBs 120A and 120B are the TRPs, the UE 110 may be configured to measure the CSI from gNB 120A while considering the gNB 120B as an interference gNB. Similarly, the UE 110 may be configured to measure the CSI from gNB 120B while considering the gNB 120A as an interference gNB. The gNBs may generate a combined CQI based on the two CSI reports received from the UE and measured from the two gNBs.

Figure 5:
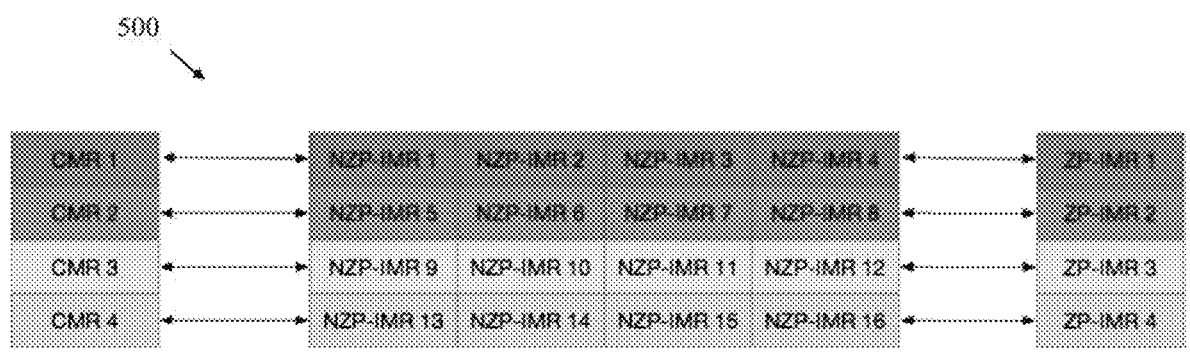
FIG. 5 shows a diagram where, for each channel measurement resource (CMR), the gNB configures N non-zero-power based interference measurement resources (NZP-IMR) and one zero power based interference measurement resource (ZP-IMR).

FIG. 5 shows a diagram 500 where, for each channel measurement resource (CMR) (in this embodiment there are four CMRs), the gNB may configure N non-zero-power based interference measurement resources (NZP-IMR) (in this embodiment N=4) and one zero power based interference measurement resource (ZP-IMR). In a CSI report configuration, N may be the same for all CMRs, or alternatively N may be the same or different for all CMRs. The CMR is used to measure channel quality for the first gNB, and the IMRs are used to measure interference from the second gNB.

When a PUSCH or a long PUCCH is used to report the CSI, various options are available with regard to the report quantity (second step above).

In a first reporting option for the first exemplary embodiment, the gNB may configure the UE to report a subset of or all of the following information for a CSI report: a CRI to indicate the CSI-RS resource for the CSI measurement, an NZP-IMR index to indicate the NZP-IMR index for the CSI measurement, an RI, a PMI, an LI and a CQI. The NZP-IMR may be selected from the N IMRs associated with the CMR corresponding to the CRI. The UE may report M NZP-IMR indexes, M being either predefined (e.g. M=1) or configured by higher layer signaling.

In one embodiment, if N is the same for each CMR, the payload size of the NZP-IMR index remains the same for each CRI and the NZP-IMR index may be transmitted in CSI part 1. For example, the CSI part 1 may include the CRI, the NZP-IMR index, the RI, and the CQI1, while the CSI part 2 may include the LI, the PMI and the CQI2, as well as other subband PMIs/CQIs.

In another embodiment, if N is different for each CMR, the payload size of the NZP-IMR index may be different for each CRI and the NZP-IMR index may be transmitted in CSI part 2. For example, the CSI part 1 may include the CRI, the RI, and the CQI1, while the CSI part 2 may include the NZP-IMR index, the LI, the PMI and the CQI2, as well as other subband PMIs/CQIs.

In a second option for reporting (step 2), for the first exemplary embodiment, the gNB may configure the UE to report a subset of or all the following information for a CSI report: a CRI to indicate the CSI-RS resource for the CSI measurement, an RI, a PMI, an LI and N CQIs for each NZP-IMR.

In one embodiment, if N is the same for each CMR, the payload size of the CQI1 corresponding to each NZP-IMR remains the same for each CRI and the N CQI may be transmitted in CSI part 1. For example, the CSI part 1 may include the CRI, the RI, and N CQI1, while the CSI part 2 may include the LI, the PMI and N CQI2, as well as other subband PMIs/CQIs.

In another embodiment, if N is different for each CMR, the payload size of the CQI1 corresponding to each NZP-IMR may be different for each CRI and the N CQI1 may be transmitted in CSI part 2. For example, the CSI part 1 may include the CRI and the RI, while the CSI part 2 may include the LI, the PMI, the N CQI1 and the N CQI2, as well as other subband PMIs/CQIs.

In a third option for reporting (step 2), for the first exemplary embodiment, the gNB may configure the UE to report a subset of or all of the following information for a CSI report: a CRI to indicate the CSI-RS resource for the CSI measurement, and N RI/PM/LI/CQI corresponding to each NZP-IMR.

In one embodiment, if N is the same for each CMR, the payload size of the CQI1 corresponding to each NZP-IMR remains the same for each CRI and the N CQI may be transmitted in CSI part 1. For example, the CSI part 1 may include the CRI and N CQI1, while the CSI part 2 may include N RI, N LI, N PMI and N CQI2, as well as other subband PMIs/CQIs.

In another embodiment, if N is different for each CMR, the payload size of the CQI1 corresponding to each NZP-IMR may be different for each CRI and the N CQI1 may be transmitted in CSI part 2. For example, the CSI part 1 may include the CRI only, while the CSI part 2 may include the N RI, the N LI, the N PMI, the N CQI1 and the N CQI2, as well as other subband PMIs/CQIs.

When a short PUCCH is used to report the CSI (step 2), for the first exemplary embodiment, all the parameters of the CSI report for the various embodiments discussed above (sent in two CSI parts for a PUSCH or a long PUCCH) may be transmitted together as one CSI, and the payload size for each element may be based on its maximum payload size. If the actual payload is smaller than the maximum payload size, padding may be used.

In a second exemplary embodiment, with regard to the first step discussed above, the UE may report the CSI measured from both gNBs. The UE may assume both gNBs are to be used for non-coherent transmission based on multi-TRP operation. The reported CQI may be based on the CSI-RS from both gNBs. In one embodiment, the gNB may configure two sets of CMRs for the UE. In another embodiment, each gNB may configure a set of CMRs, where each set of CMRs belongs to a different group and a group ID for each CMR may be configured or determined by the higher layer-configured scramble ID.

Figures 6, 7:
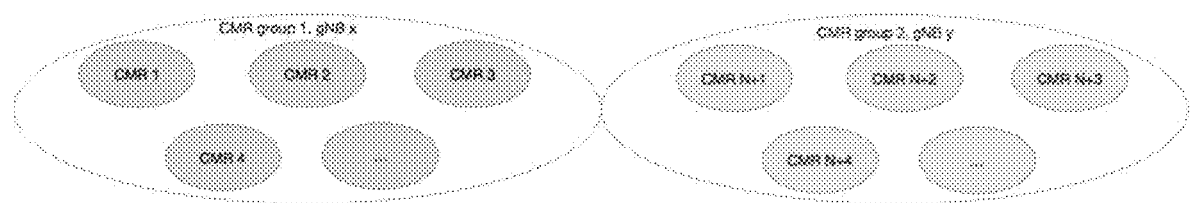
FIG. 6 shows a diagram where a CMR group is configured for each of gNBs x and y.
FIG. 7 shows a diagram for allowable configurations for RI parameters.

FIG. 6 shows a diagram 600 where a CMR group is configured for each of gNBs x and y. When N CMRs are indicated, the first group comprises a first set of CMRs 1 to N and the second group comprises a second set of CMRs N+1 to N+N. For both options, the CMRs in each set/group indicate the CSI-RS from a different gNB.

With regard to the report quantity (step 2 discussed above), various options are available. In a first option for the second exemplary embodiment, the gNB configures the UE to report a subset of or all the following information for a CSI report: two CRIs, one CRI being selected from each CMR set/group, two RI/PMI/LI, each corresponding to each CRI, and a CQI for each codeword based on the measurement of the two CRIs.

In a second option for the second exemplary embodiment, the gNB configures the UE to report a subset of or all the following information for a CSI report: two CRIs, one CRI being selected from each CMR set/group, two RI/PMI, each corresponding to one CRI, a CQI for each codeword based on the measurement of the two CRIs, and an LI selected based on the total number of layers indicated by the two RI. If there are two codewords reported, the LI is selected based on the total number of layers corresponding to the codeword with the highest CQI.

In a third option for the second exemplary embodiment, the gNB configures the UE to report a subset of or all the following information for a CSI report: two CRIs, one CRI being selected from each CMR set/group, and two RI/PMI/LI/CQI, each corresponding to one CRI.

For each of the options 1-3 for the second exemplary embodiment, the total number of layers indicated by the two RIs should not exceed a maximum number of layers configured by higher layer signaling or reported by UE capability. In one embodiment, the gNB may configure a restricted rank per CMR set/group. The indication of reported RI corresponding to a CMR set/group may be determined based on the rank restriction. For example, if the gNB configures the rank restriction as {0101}, implying rank2 and rank4 are allowed, then RI=0 indicates rank2 and RI=1 indicates rank4.

In another embodiment, the gNB may configure the restricted rank across CMR sets/groups. The total reported RI corresponding to a CMR set/group should not be equal to the restricted rank (e.g. rank2). FIG. 7 shows a diagram 700 for allowable configurations for RI parameters.

For the first option described above, when the CSI is reported by PUSCH or long PUCCH, CSI part 1 may include 2 CRIs, 2 RIs, and CQI1, while CSI part 2 may include LI, PMI and CQI2, as well as other subband PMIs/CQIs. For the second option described above, when the CSI is reported by PUSCH or long PUCCH, CSI part 1 may include 2 CRIs, 2 RIs, and CQI1, while CSI part 2 may include LI, PMI and CQI2, as well as other subband PMIs/CQIs. For the third option described above, when CSI is reported by PUSCH or long PUCCH, the CSI part 1 could include 2 CRIs, 2 RIs, and 2 CQI1, while CSI part 2 may include LI, PMI and 2 CQI2, as well as other subband PMIs/CQIs.

Additional options are available with regard to the report quantity. In a fourth option for the second exemplary embodiment, the gNB configures the UE to report a subset of or all the following information for a CSI report: two CRIs, each CRI being selected from each CMR set/group, one RI for indicating the layer combinations corresponding to the two CRIs, and two PMI/LI/CQI, each corresponding to each CRI. In a fifth option for the second exemplary embodiment, the gNB configures the UE to report a subset of or all the following information for a CSI report: two CRIs, each CRI being selected from each CMR set/group, one RI for indicating the layer combinations corresponding to the two CRIs, one LI indicating a best layer among the total number of layers, and two PMI/CQI, each corresponding to each CRI. In a sixth option for the second exemplary embodiment, the gNB configures the UE to report a subset of or all the following information for a CSI report: two CRIs, each CRI being selected from each CMR set/group, one RI/CQI for indicating the layer combinations corresponding to the two CRIs, one LI indicating a best layer among the total number of layers, and two PMI, each corresponding to each CRI.

For each of the options 4-6 described above, the indication of the RI may be determined by the rank restriction configured by higher layer signaling and a maximum number of layers that are supported by the UE. For example, if the rank restriction is configured as {0101}, the indication of RI may be as follows: RI=0: one layer for CRI1 and one layer for CRI2; RI=1: one layer for CRI1 and three layers for CRI2; RI=2: two layers for CRI1 and two layers for CRI2; RI=3: three layers for CRI1 and one layer for CRI2.

For the fourth option described above, when the CSI is reported by a PUSCH or a long PUCCH, the CSI part 1 may include two CRIs, one RI, and two CQI1, while the CSI part 2 may include an LI, a PMI and two CQI2, as well as other subband PMIs/CQIs. For the fifth option described above, when the CSI is reported by a PUSCH or a long PUCCH, the CSI part 1 may include two CRIs, one RI, and two CQI1, while the CSI part 2 may include an LI, a PMI and a CQI2, as well as other subband PMIs/CQIs. For the sixth option described above, when the CSI is reported by a PUSCH or a long PUCCH, the CSI part 1 may include two CRIs, one RI, and one CQI1, while the CSI part 2 may include an LI, a PMI and a CQI2, as well as other subband PMIs/CQIs.

For all of the options 1-6 described above, when the CSI is reported by a short PUCCH, all of the components of a CSI report may be transmitted together, where the payload size for each element may be based on its maximum payload size. If the actual payload size is smaller than the maximum payload size, padding may be used.

In a third exemplary embodiment, a best companion CSI feedback is considered. In a scenario where there are M1 CSI-RS resources for TRP1, M2 CSI-RS resources for TRP2, and optionally a CSI-IM, a UE may generate a subset of the following reports.

A first report may include an RI, a CQI and optionally a PMI. For the first report, the UE indicates one desired CSI-RS resource for CMR out of the M1 CSI resources and one (or more) CSI-RS resources for an NZP-CMR out of the M2 CSI resources. A second report may include an RI, a CQI and optionally a PMI. For the second report, the UE indicates one desired CSI-RS resource for CMR out of the M2 CSI resources and one (or more) CSI-RS resources for NZP-CMR out of the M1 CSI resources.

A third report may include an RI, a CQI and optionally a PMI. For the third report, the UE indicates one desired CSI-RS resource for CMR out of the M1 CSI resources and uses the configured/indicated CSI-IM for an interference measurement. A fourth report may include an RI, a CQI and optionally a PMI. For the fourth report, the UE indicates one desired CSI-0RS resource for CMR out of the M2 CSI resources and uses the configured/indicated CSI-IM for an interference measurement.

The CSI Processing Unit (CPU) for the generated report(s) is X, X>1. The UE may report only one out of the four reports discussed above. Even when X>1 the UE may need to calculate all the reports and select one of them for reporting.

Figure 8:
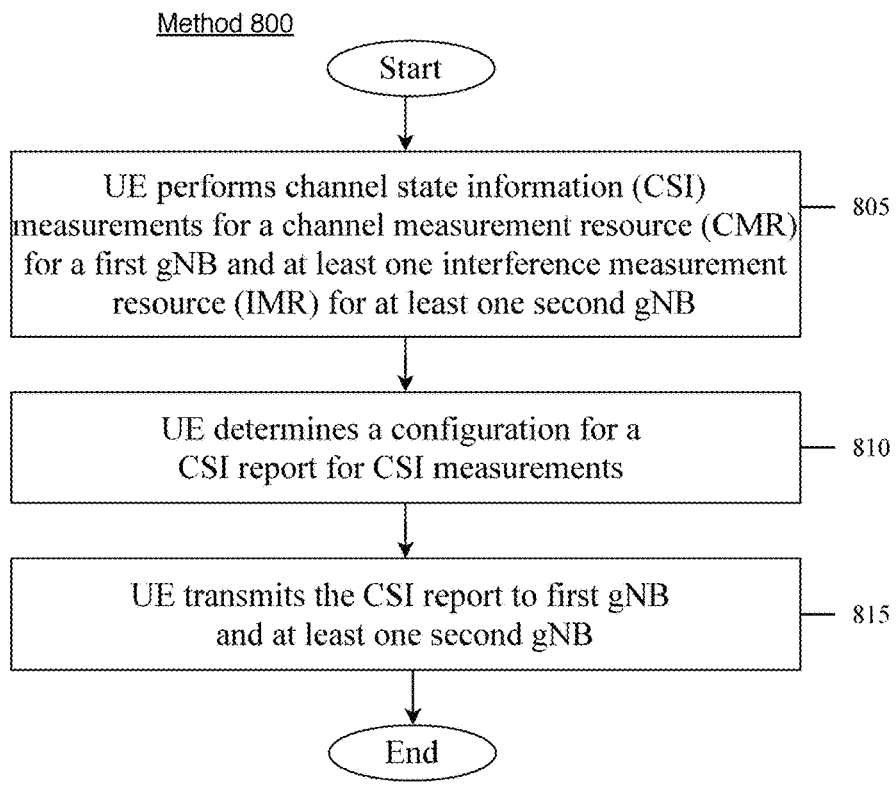
FIG. 8 shows a method for configuring a CSI report at a user equipment (UE) in a multiple transmission and reception point (multi-TRP) configuration according to a first exemplary embodiment

FIG. 8 shows a method 800 for configuring a CSI report at a user equipment (UE) in a multiple transmission and reception point (multi-TRP) configuration according to a first exemplary embodiment. In 805, the UE performs channel state information (CSI) measurements for a channel measurement resource (CMR) for a first gNB and at least one interference measurement resource (IMR) for at least one second gNB. As discussed above, in the first exemplary embodiment, a second gNB in the multi-TRP operation is considered an interference gNB. The UE is configured with a plurality of NZP-IMRs and one ZP-IMR for each CMR and performs measurements thereon for the interference gNB.

In 810, the UE determines a configuration for a CSI report for the CSI measurements including a channel quality indicator (CQI) measurement for the CMR and the at least one IMR. The CSI report may be configured differently depending on, e.g. whether a PUSCH or a short/long PUCCH is configured for reporting the CSI, according to the first exemplary embodiment discussed above.

In 815, the UE transmits the CSI report to the first gNB and the at least one second gNB.

Figure 9:
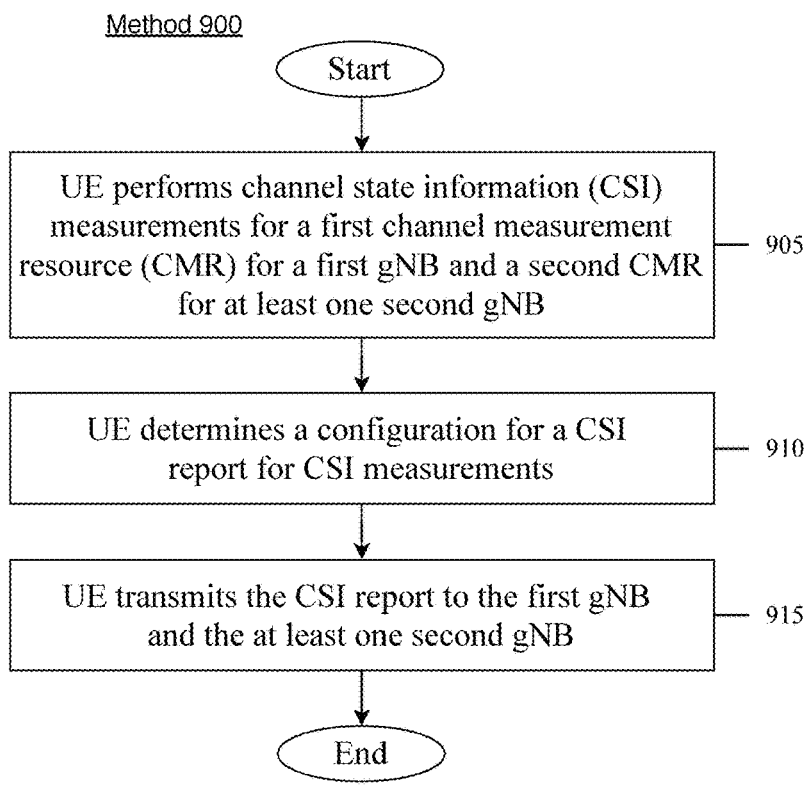
FIG. 9 shows a method for configuring a CSI report at a user equipment (UE) in a multiple transmission and reception point (multi-TRP) configuration according to a second exemplary embodiment.

FIG. 9 shows a method 900 for configuring a CSI report at a user equipment (UE) in a multiple transmission and reception point (multi-TRP) configuration according to a second exemplary embodiment. In 905, the UE performs channel state information (CSI) measurements for a first channel measurement resource (CMR) for a first gNB and a second CMR for at least one second gNB. As discussed above, in the second exemplary embodiment, both gNBs are considered to be performing non-coherent transmissions. A first group of CMRs is configured for the first gNB and a second group of CMRs is configured for the second gNB.

In 910, the UE determines a configuration for a CSI report for the CSI measurements including a channel quality indicator (CQI) measurement for each of the first and second CMRs. The CSI report may be configured differently depending on, e.g. whether a PUSCH or a short/long PUCCH is configured for reporting the CSI, according to the second exemplary embodiment discussed above.

In 915, the UE transmits the CSI report to the first gNB and the at least one second gNB.

In 815 and 915 and in other embodiments described above, it was stated that the UE transmits the CSI report to the first gNB and the at least one second gNB. In other embodiments, the CSI report may be transmitted to only one gNB. In this embodiment, the UE may assume that the multiple gNBs (two or more) are coordinated. Thus, the UE may then transmit the CSI to a single gNB, which may share the CSI report with the other coordinated gNBs.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

The invention claimed is:

1. A method, comprising:
   at a user equipment (UE) in a multiple transmission and reception point (multi-TRP) configuration having simultaneous connections with a first next generation node B (gNB) and at least one second gNB over a same carrier, wherein transmission from the first gNB and the at least one second gNB are non-coherent:
   performing channel state information (CSI) measurements for a first channel measurement resource (CMR) for the first gNB;
   performing CSI measurements for a second CMR for the at least one second gNB;
   determining a configuration for a CSI report for the CSI measurements including a channel quality indicator (CQI) measurement for each of the first and the second CMR; and
   generating, for transmission, the CSI report to at least one of the first gNB and the at least one second gNB, wherein when the CSI report includes two sets of a rank indicator (RI), each of the two sets of RI are reported in a joint RI index corresponding to one of four rank combinations.

2. The method of claim 1, wherein the CSI measurements are performed for a first CMR group comprising N first CMRs for the first gNB and a second CMR group comprising N second CMRs for the second gNB.

3. The method of claim 2, wherein each CMR group has a group identifier (ID) configured by a higher layer-configured scramble ID.

4. The method of claim 2, wherein the CSI report includes two sets of a channel state information reference signal (CSI-RS) resource index (CRI), a rank indicator (RI), a precoding matrix indicator (PMI), a layer indicator (LI), wherein a first set corresponds to the first CMR group and a second set correspond to the second CMR group, and a CQI measurement for each codeword based on measurements on the CSI-RS resources.

5. The method of claim 2, wherein the CSI report includes a first and second channel state information reference signal (CSI-RS) resource index (CRI) corresponding to the first and second CMR groups, a first and second rank indicator (RI) corresponding to the first and second CMR groups, a first and second precoding matrix indicator (PMI) corresponding to the first and second CMR groups, a layer indicator (LI) selected based on a total number of layers indicated by the first and second RIs, and a CQI measurement for each codeword based on the measurements on the CSI-RS resources.

6. The method of claim 2, wherein the CSI report includes two sets of a channel state information reference signal (CSI-RS) resource index (CRI), a rank indicator (RI), a precoding matrix indicator (PMI), a layer indicator (LI), and CQI measurements, wherein a first set corresponds to the first CMR group and a second set correspond to the second CMR group.

7. The method of claim 6, wherein a total number of layers indicated by the RIs is configured to not exceed a maximum number of layers configured by higher layer signaling or reported by UE capability, wherein an indication of the RIs corresponding to a CMR group is determined based on a rank restriction.

8. A user equipment (UE), comprising:
   a transceiver configured to simultaneously connect with a first next generation node B (gNB) and at least one second gNB over a same carrier, wherein transmission from the first gNB and the at least one second gNB are non-coherent; and
   a processor configured to:
     perform channel state information (CSI) measurements for a first channel measurement resource (CMR) for the first gNB;
     perform CSI measurements for a second CMR for the at least one second gNB; and
     determine a configuration for a CSI report for the CSI measurements including a channel quality indicator (CQI) measurement for each of the first and the second CMR;
   wherein the transceiver is further configured to transmit the CSI report to at least one of the first gNB and the at least one second gNB, wherein when the CSI report includes two sets of a rank indicator (RI), each of the two sets of RI are reported in a joint RI index corresponding to one of four rank combinations.

9. The UE of claim 8, wherein the CSI measurements are performed for a first CMR group comprising N first CMRs for the first gNB and a second CMR group comprising N second CMRs for the second gNB.

10. The UE of claim 9, wherein each CMR group has a group identifier (ID) configured by a higher layer-configured scramble ID.

11. The UE of claim 9, wherein the CSI report includes two sets of a channel state information reference signal (CSI-RS) resource index (CRI), a rank indicator (RI), a precoding matrix indicator (PMI), a layer indicator (LI), wherein a first set corresponds to the first CMR group and a second set correspond to the second CMR group, and a CQI measurement for each codeword based on measurements on the CSI-RS resources.

12. The UE of claim 9, wherein the CSI report includes a first and second channel state information reference signal (CSI-RS) resource index (CRI) corresponding to the first and second CMR groups, a first and second rank indicator (RI) corresponding to the first and second CMR groups, a first and second precoding matrix indicator (PMI) corresponding to the first and second CMR groups, a layer indicator (LI) selected based on a total number of layers indicated by the first and second RIs, and a CQI measurement for each codeword based on the measurements on the CSI-RS resources.

13. The UE of claim 9, wherein the CSI report includes two sets of a channel state information reference signal (CSI-RS) resource index (CRI), a rank indicator (RI), a precoding matrix indicator (PMI), a layer indicator (LI), and CQI measurements, wherein a first set corresponds to the first CMR group and a second set correspond to the second CMR group.

14. The UE of claim 13, wherein a total number of layers indicated by the RIs is configured to not exceed a maximum number of layers configured by higher layer signaling or reported by UE capability, wherein an indication of the RIs corresponding to a CMR group is determined based on a rank restriction.

15. A processor of a user equipment (UE) configured to:
perform channel state information (CSI) measurements for a first channel measurement resource (CMR) for a first next generation node B (gNB) and CSI measurements for a second CMR for an at least one second gNB, wherein the UE is simultaneously connected with the first gNB and the at least one second gNB over a same carrier, and wherein transmissions from the first gNB and the at least one second gNB are non-coherent; and
determine a configuration for a CSI report for the CSI measurements including a channel quality indicator (CQI) measurement for each of the first and the second CMR;
generate, for transmission, the CSI report to at least one of the first gNB and the at least one second gNB, wherein when the CSI report includes two sets of a rank indicator (RI), each of the two sets of RI are reported in a joint RI index corresponding to one of four rank combinations.

16. The processor of claim 15, wherein the CSI measurements are performed for a first CMR group comprising N first CMRs for the first gNB and a second CMR group comprising N second CMRs for the second gNB.

17. The processor of claim 16, wherein each CMR group has a group identifier (ID) configured by a higher layer-configured scramble ID.

18. The processor of claim 16, wherein the CSI report includes two sets of a channel state information reference signal (CSI-RS) resource index (CRI), a rank indicator (RI), a precoding matrix indicator (PMI), a layer indicator (LI), wherein a first set corresponds to the first CMR group and a second set correspond to the second CMR group, and a CQI measurement for each codeword based on measurements on the CSI-RS resources.

19. The processor of claim 16, wherein the CSI report includes a first and second channel state information reference signal (CSI-RS) resource index (CRI) corresponding to the first and second CMR groups, a first and second rank indicator (RI) corresponding to the first and second CMR groups, a first and second precoding matrix indicator (PMI) corresponding to the first and second CMR groups, a layer indicator (LI) selected based on a total number of layers indicated by the first and second RIs, and a CQI measurement for each codeword based on the measurements on the CSI-RS resources.

20. The processor of claim 16, wherein the CSI report includes two sets of a channel state information reference signal (CSI-RS) resource index (CRI), a rank indicator (RI), a precoding matrix indicator (PMI), a layer indicator (LI), and CQI measurements, wherein a first set corresponds to the first CMR group and a second set correspond to the second CMR group.

* * * * *